March 4, 1924.

H. J. ZIMMERMAN

AUTOMATIC TRANSMISSION BAND ADJUSTER

Filed Sept. 3, 1920

1,485,752

Witnesses

Inventor
Harry J. Zimmerman
By
Attorney.

Patented Mar. 4, 1924.

1,485,752

UNITED STATES PATENT OFFICE.

HARRY J. ZIMMERMAN, OF PEKIN, ILLINOIS.

AUTOMATIC TRANSMISSION-BAND ADJUSTER.

Application filed September 3, 1920. Serial No. 407,899.

*To all whom it may concern:*

Be it known that I, HARRY J. ZIMMERMAN, citizen of the United States of America, residing at Pekin, in the county of Tazewell and State of Illinois, have invented certain new and useful Improvements in Automatic Transmission-Band Adjusters, of which the following is a specification.

My invention relates to automatic transmission band adjusters, and is adapted more particularly for use with Ford transmission bands.

The object of the invention is to produce an automatic transmission band adjuster of simple, durable and inexpensive construction.

Another object of my invention is to produce a device capable of being used in conjunction with the usual transmission band controlling mechanism, said device automatically taking up the wear on the bands and doing away with all ordinary adjustment means therefor.

With these and other objects in view, my invention consists in the construction, arrangement and combination of parts of the device as hereinafter more fully set forth.

In the accompanying drawings.

Figure 1:
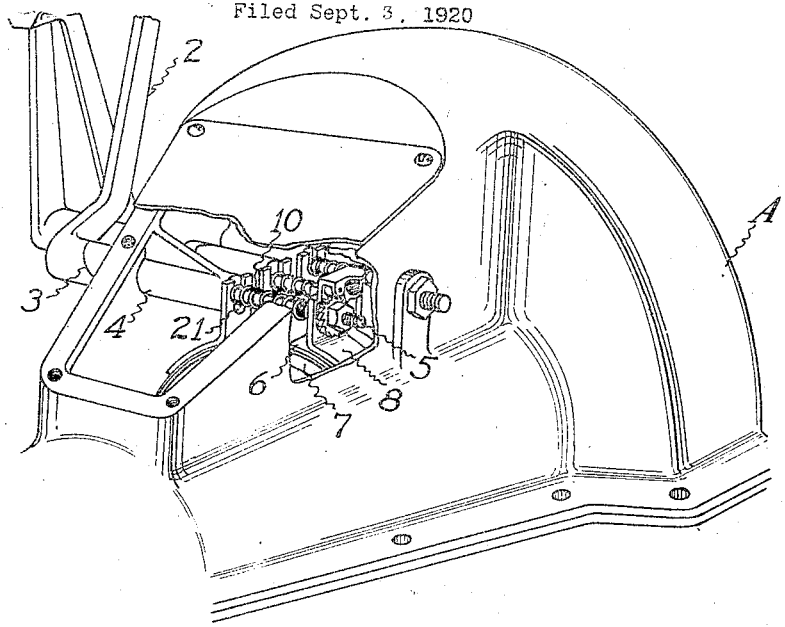
Fig. 1 is a perspective view of a gear casing mounted in a motor vehicle, a portion broken away in order to show my automatic band adjuster.
Figure 3:
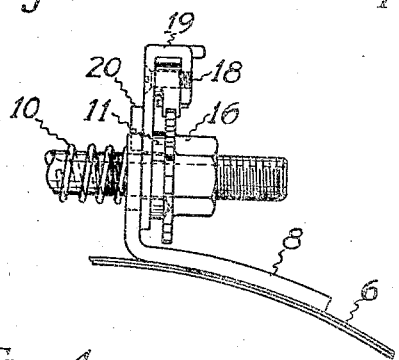
Fig. 3 is a front elevation of the same.
Figure 2:
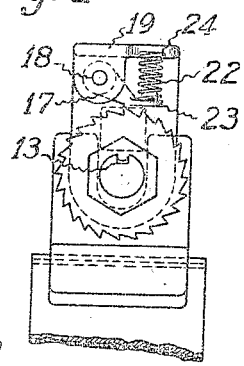
Fig. 2 is an end elevation of the device.
Figure 4:
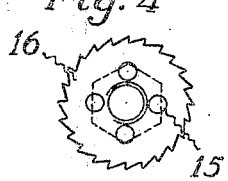
Fig. 4 is a rear view of the ratchet member.
Figures 5, 6:
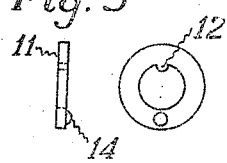
Fig. 5 is a side view of the key member.
Fig. 6 is a front view of the key.

The construction is as follows:

A represents a gear casing on a motor vehicle, having the transmission gearing mounted within. Foot pedal 2 has the customary cam surface connection 3 with the threaded shaft 5 which rides in the bearing 4, pedal action thereby producing inward and outward movement of the shaft. A broken band 6 surrounds a drum 7, and end members 8 mounted on band 6 are U-slotted on their upper ends to take therein the shaft 5. A coil spring 10 surrounds the shaft and abuts the upper ends of the end members. A member 11 is keyed on the shaft 5 by the lug 12 and a corresponding groove 13 on the shaft. A lug 14 projecting from the key 11 fits into a corresponding recess 15 on a screw threaded ratchet member 16 screwed on the inner end of shaft 5. Riding on the ratchet is a pawl 17, pivotally mounted at 18 on the bracket 19, said bracket having at its base a hole for the entrance of the shaft, and a lug 20 projecting from its rear to intersect the upper portion of groove 21 on the end member 8, thereby providing a secure mounting for the pawl. A coil spring 22 is held in operable position by the lug 23 on the pawl 17 and a groove 24 on the under side of the bracket 19.

The operation of the device is as follows:—A downward pressure of the pedal causes a tightening of the transmission band 6 on the drum 7, through the cam surface connection which draws the shaft 5 inwardly, and a release of the pedal causes the coil spring 10 to throw the band out of engagement with the drum when the shaft 5 has been released and moved outwardly. In order to more clearly describe the operation of the device, we will say that the brake band has been worn considerably and is loose on the drum 7. When the pedal is pressed downwardly the shaft 5 moves in a clockwise manner and inasmuch as it is drawn inwardly, due to the cam surface connections, the ratchet member 16, key 11, bracket 19, and the end members 8 or portions thereof, are all jammed together. As the shaft 5 turns slightly in its clockwise movement, it turns with it the key 11 which rotates with said shaft, due to its keyed relation therewith and inasmuch as the ratchet member 16 has been thrown into frictional contact with said key due to the tightening action of the pedal and also tension of coil spring 10, this ratchet member is also turned with a movement to correspond with that of key 11.

It may be seen here that the frictional contact between the ratchet 16 and key 11 is all that is necessary to permit this corresponding tightening of the ratchet member or turning to correspond with that of the key member. However, in view of the fact that this device is mounted within the transmission casing of an automobile and as there is considerable oil and grease therein, an additional means is provided for insuring this tightening of the ratchet member should the oil overcome the friction that is set up between the ratchet member and key. This is accomplished by providing a raised projection or lug 14 on the key 11 and a plurality of recesses 15 in the ratchet member. To continue with the operation of the device, after the pedal has been thrust downwardly and the ratchet member and key member turned to correspond with shaft 5, inasmuch as the band, as has been stated, is loose on the drum, the ratchet member will move a distance beyond one of its ratchet teeth with the result that when it is moved this far, the pawl 17 will drop behind said tooth and prohibit an anti-clockwise movement of the ratchet member when the pedal has been released and the shaft 5 carrying the key 11 moved in an anti-clockwise manner. Thus it will be seen with the release of the pedal, the frictional engagement of the key 11 and ratchet 16 will be relieved and the key member, due to its keyed relation with the shaft 5, will move in an anti-clockwise movement but not the ratchet member.

The tightening action which accompanies one movement of the pedal when the brake band is very loose, has just been described, and it will be readily understood that this action will continue until the brake band has been tightened, we will say, to the most efficient point, that is, when a downward pressure on the pedal and a release will not tighten the band or rather when a downward pressure on the foot pedal will merely move the ratchet member under the pawl 17, but such a distance thereunder that the pawl will not engage a new tooth on said member. The device is constructed with such length of teeth on the ratchet member that the movement of the shaft 5 when the band is in its correct adjustment with the drum, will not turn the ratchet member beyond the length of one of the teeth, with the result therefore, that until the band has been worn considerably, the pawl will not engage a new tooth. However, when the band has been worn to this degree the pawl will engage a new tooth on the ratchet member. A tightening will have taken place to compensate for the wear on the band and again a similar movement back and forth of the pawl on one of these teeth will take place until the band has been worn again to such a point that it will need tightening. Thus, we will see that the tightener is positively automatic, and works in a gradual manner to take up the wear on the bands.

The operation of the device has been so far described with the idea of showing that the device, when placed upon the end of the shaft 5, will tighten the band automatically even though the correct adjustment is not made to start with, however, it is clear that the device may be put on the shaft 5, screwed to the efficient adjustable point and thence will act automatically to take up the band from that point.

To more clearly bring out the action of the key and its relation to the ratchet member, with the pedal action and the turning of the shaft 5 in a clockwise position, the key member will be forced into frictional engagement with the ratchet member and will turn said ratchet member not only by the friction set up between these two elements which is sufficient, but by the lug 14 which has possible engagement with one of the plurality of recesses 15 in the ratchet member. Also with the release of the pedal the frictional engagement of these members is relieved and the key slides in an anti-clockwise manner and also the ratchet member will have an anti-clockwise movement, unless the band is so loose that the pawl engages a new tooth and tightens the band. However, when the band has been adjusted to its most efficient point, there will be a tightening action on the ratchet member, we will say, only once in 500 or 1,000 times to compensate for the wear on the band, and therefore the ordinary movement will be that the ratchet member moves in an anti-clockwise movement to agree with the movement of shaft 5, said movement not being ordinarily sufficient to have the pawl engage a new tooth on the ratchet member. As pressure is applied to the pedal the key will be forced into frictional engagement with the ratchet member and will turn it; however, as the pedal is released, the key will rotate in an anti-clockwise manner and also the ratchet will have an anti-clockwise movement under the pawl which will merely ride on the upper surface one of these teeth, but will not engage a new tooth.

Briefly the general movement, we see, is that the ratchet member upon pressure and release of the pedal slides under this pawl but not to such an extent that a new tooth will be engaged by the pawl until the band has become worn to such an extent that the pedal will move far enough downward to permit the pawl to engage a new tooth on the ratchet member. Thus, a series of pedal movements will again have to take place and a wearing of the brake band before there will be another tightening of the band.

Thus we may see that with the device described an automatic means has been provided to compensate for the wear on a broken brake band mounted on a drum.

What is claimed is:

1. The combination of a drum, a broken band thereon, having projecting end members, a foot pedal having a beveled bearing surface, a shaft connected to said foot pedal and extending through the end members, a spring between said end members, a ratchet member on said shaft, a bracket mounted on the inner end member, and a spring pressed pawl pivotally mounted on said bracket in engagement with said ratchet.

2. In combination with a transmission casing, a shaft mounted therein and carrying ing upon its outer end a pedal, a block slidably mounted upon said shaft and held against rotation, a ratchet nut threaded upon said shaft, and a pawl swingingly mounted upon said block and adapted to engage the teeth of said ratchet nut.

3. In combination with a transmission casing, a shaft mounted therein and carrying upon one end a pedal, holding brackets loosely mounted upon said shaft and attached, respectively, to opposite ends of a brake band, a block slidably mounted upon said shaft and held against rotation by engagement with one of said holding brackets, a ratchet nut threaded upon said shaft, and a pawl swingingly mounted upon said block and adapted to engage the teeth of said ratchet nut.

4. In combination with a transmission casing, a pedal shaft mounted therein and carrying upon one end a pedal, a drum, an open band surrounding said drum, holding brackets loosely mounted upon said shaft and attached, respectively, to opposite ends of said band, a block slidably mounted upon said shaft, and held against rotation, a ratchet nut threaded upon said shaft, and a pawl swingingly mounted upon said block and adapted to engage the teeth of said ratchet nut.

5. In combination with a transmission casing, a pedal shaft mounted therein and carrying upon one end a pedal, a block slidably mounted upon said shaft and held against rotation, a washer also slidably mounted upon said shaft and provided with an inwardly extending tongue engaging a slot in said shaft, a ratchet nut threaded upon said shaft, and a pawl mounted upon said block and adapted to engage the teeth of said ratchet nut.

6. In combination with a transmission casing, a pedal shaft mounted therein and carrying upon one end a pedal, holding brackets loosely mounted upon said shaft and attached, respectively, to opposite ends of a brake band, a block slidably mounted upon said shaft and held against rotation by engagement with one of said holding brackets, a washer also slidably mounted upon said shaft, and provided with an inwardly extending tongue engaging a slot in said shaft, a ratchet nut threaded upon said shaft, and a pawl swingingly mounted upon said block and adapted to engage the teeth in said ratchet nut.

7. In combination with the transmission means of a motor vehicle, a pedal shaft, and a transmission band, of ratchet mechanism connected with the pedal shaft and a part of the transmission band for automatically taking up the slack of the band by the movement of the pedal.

8. In combination with the transmission means of a motor vehicle, a pedal shaft, and a transmission band, of ratchet mechanism connected with the pedal shaft and a part of the transmission band for automatically taking up the slack of the band by the movement of the pedal, such means consisting of a ratchet wheel screw threaded on the pedal shaft and a pawl connected with a part of the transmission band and engaging the ratchet wheel.

9. In a transmission band adjuster, the combination with the forked end of the band and the shaft disposed therethrough, of a member on the shaft and engaged with the band end, and ratchet means between said member and the shaft for holding the shaft upon too great forward movement to draw the band ends toward each other.

10. In a transmission band adjuster, the combination with the forked end of the band and the shaft disposed therethrough, of a member on one end of the shaft and having means engaged in the forked end of the band, a ratchet nut on the shaft, and a pawl on the said member engaged with the nut.

11. In a transmission band adjuster, the combination with the forked end of the band and the shaft disposed therethrough, of a block disposed on one end of the shaft, said block having a lug engaged in the forked end of the band to prevent movement of the block, a ratchet-toothed nut on the said end of the shaft, and a pawl on the block engaged with the nut.

12. A rotating drum, a brake band surrounding said drum, means for holding said band against turning, means comprising a spring for expanding said band, means for contracting said band so as to produce a braking action, said means comprising a bolt joining the two ends of said band, a nut on the end of said bolt, means for rotating said bolt and simultaneously moving the same in the direction of its axis, and means for rotating said nut so as to bring the ends of the band close together whenever the rotary movement of the bolt exceeds a pre-determined amount.

13. An automatic means for adjusting a brake band so as to compensate for wear, comprising a bolt, a nut co-operating therewith, a member surrounding said bolt, a pawl on said member, a spring tending to move the end of said pawl towards the bolt, a washer between said member and said nut, a longitudinal groove in said bolt, a projecting portion on said washer adapted to engage said groove to prevent the washer from rotating on the bolt, said nut having a series of ratchet teeth adapted to co-operate with the pawl.

In testimony whereof I have affixed my signature.

HARRY J. ZIMMERMAN.